United States Patent [19]
Barth

[11] Patent Number: 5,885,048
[45] Date of Patent: Mar. 23, 1999

[54] POWERED CART FOR MOVING HEAVY OBJECTS

[76] Inventor: James Kenneth Barth, 3823 First St., Hubbard, Oreg. 97032

[21] Appl. No.: 947,010

[22] Filed: Oct. 8, 1997

[51] Int. Cl.$^6$ ...................................................... B60P 1/02
[52] U.S. Cl. ........................... 414/495; 414/458; 414/540; 187/244; 254/2 R
[58] Field of Search ...................................... 414/458, 459, 414/460, 461, 495, 498, 539, 540, 812, 608; 187/237, 244; 254/2 R, 2 C, 93 R, 93 VA

[56] References Cited

U.S. PATENT DOCUMENTS

| | | | |
|---|---|---|---|
| 5,322,408 | 6/1994 | Wooden | 414/495 |
| 5,580,207 | 12/1996 | Kiebooms et al. | 414/495 |

FOREIGN PATENT DOCUMENTS

| | | | |
|---|---|---|---|
| 581631 | 8/1959 | Canada | 414/495 |
| 1267111 | 3/1990 | Canada | 414/495 |
| 2717166 | 11/1978 | Germany | 414/495 |
| 874437 | 10/1981 | U.S.S.R. | 414/458 |

*Primary Examiner*—Frank E. Werner
*Attorney, Agent, or Firm*—Robert L. Harrington

[57] ABSTRACT

A powered cart for moving heavy objects. The cart has a container portion that is elevated and lowered under power with a floor of the container portion capable of being lowered onto a surface supporting the cart. The floor has an inclined edge that provides a ramp for loading items onto the cart. The cart is propelled by a steerable wheel and the wheel is provided with a braking system. A removable gate is provided for securing the open side of the chassis and is provided with an automatic latch mechanism that locks the gate in position when the container portion is elevated off the supporting surface.

9 Claims, 5 Drawing Sheets

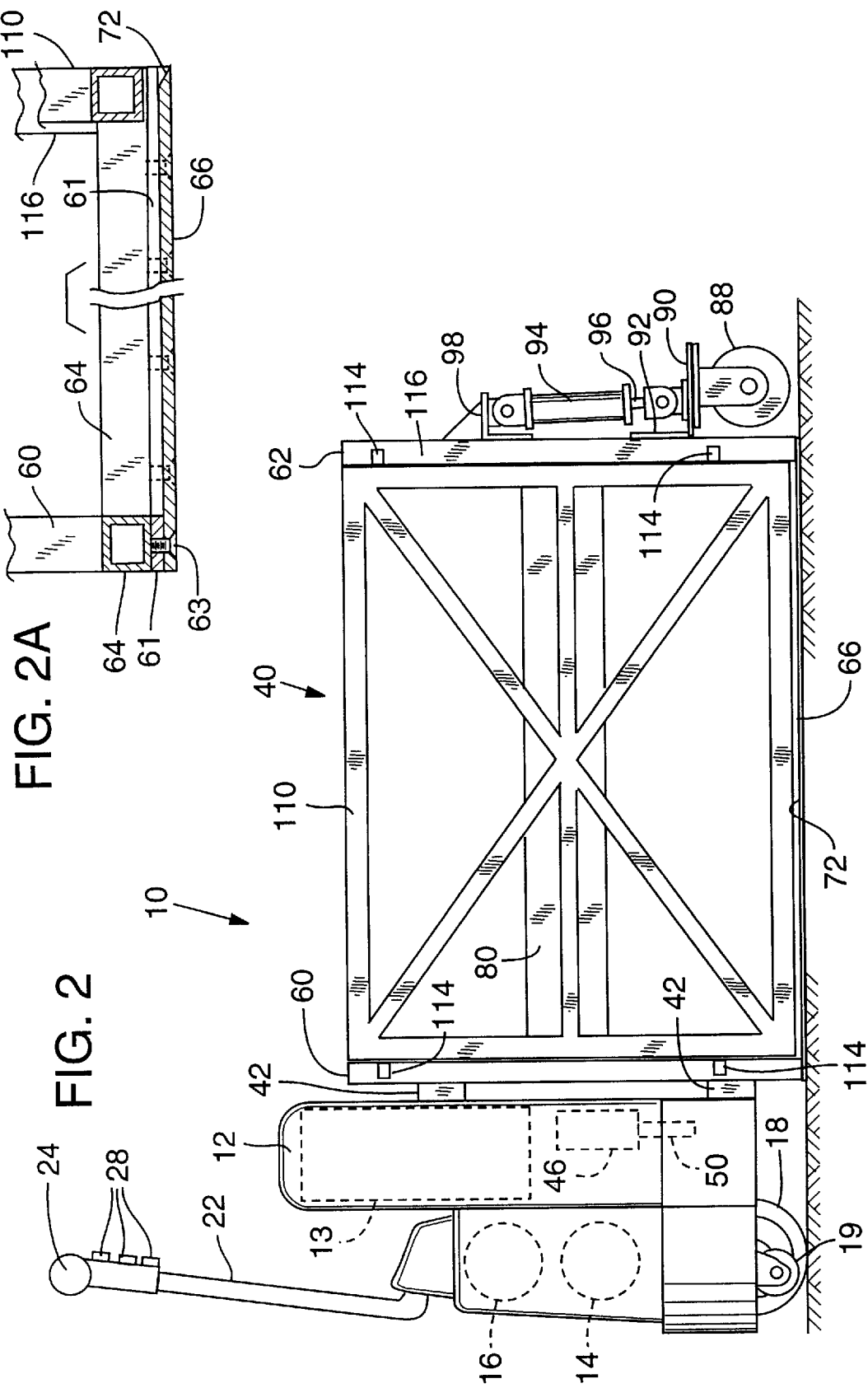

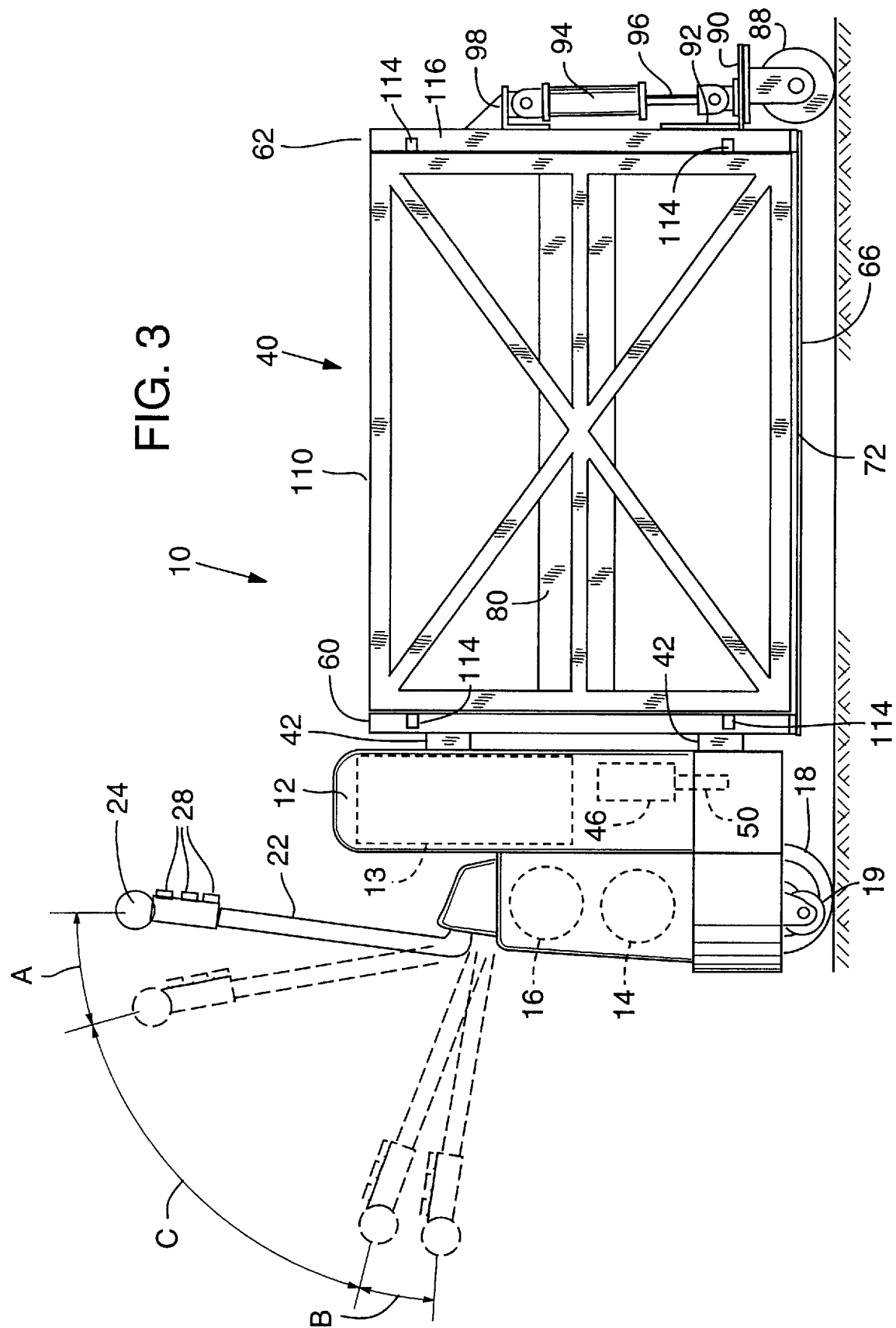

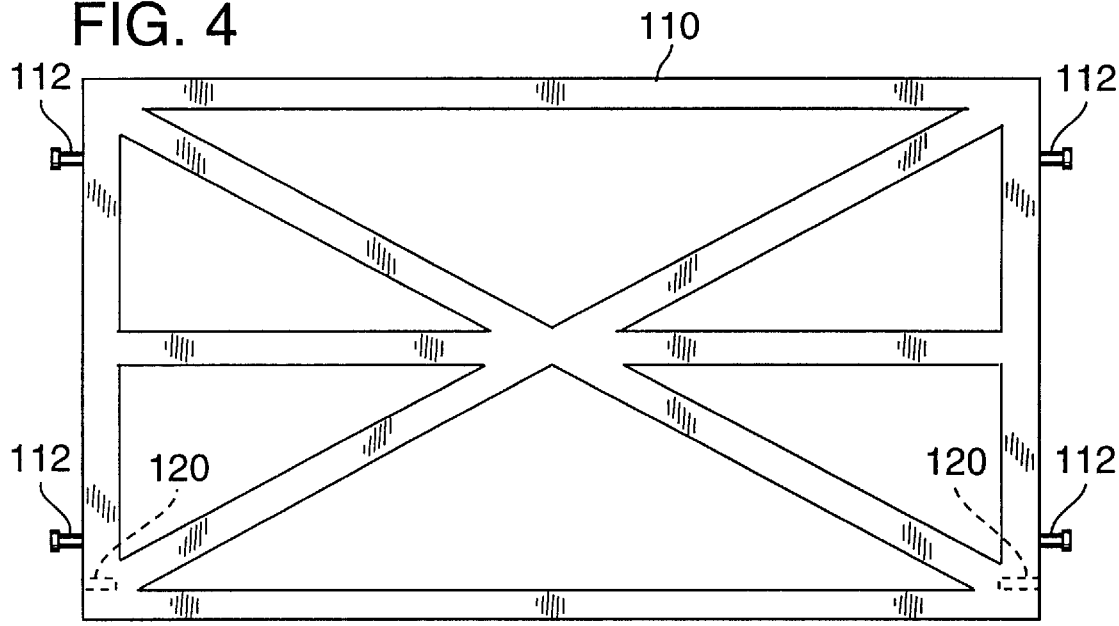
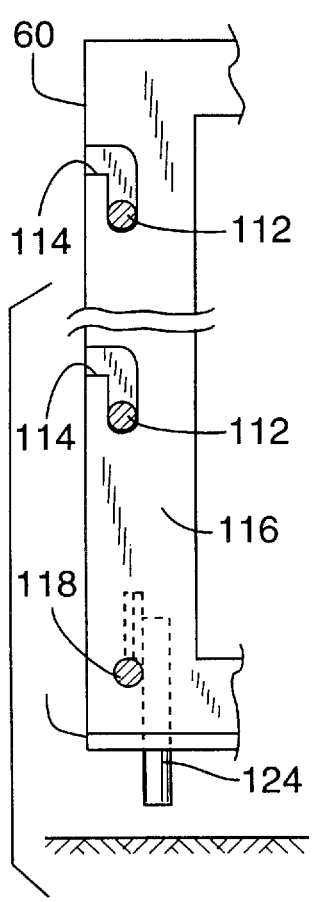
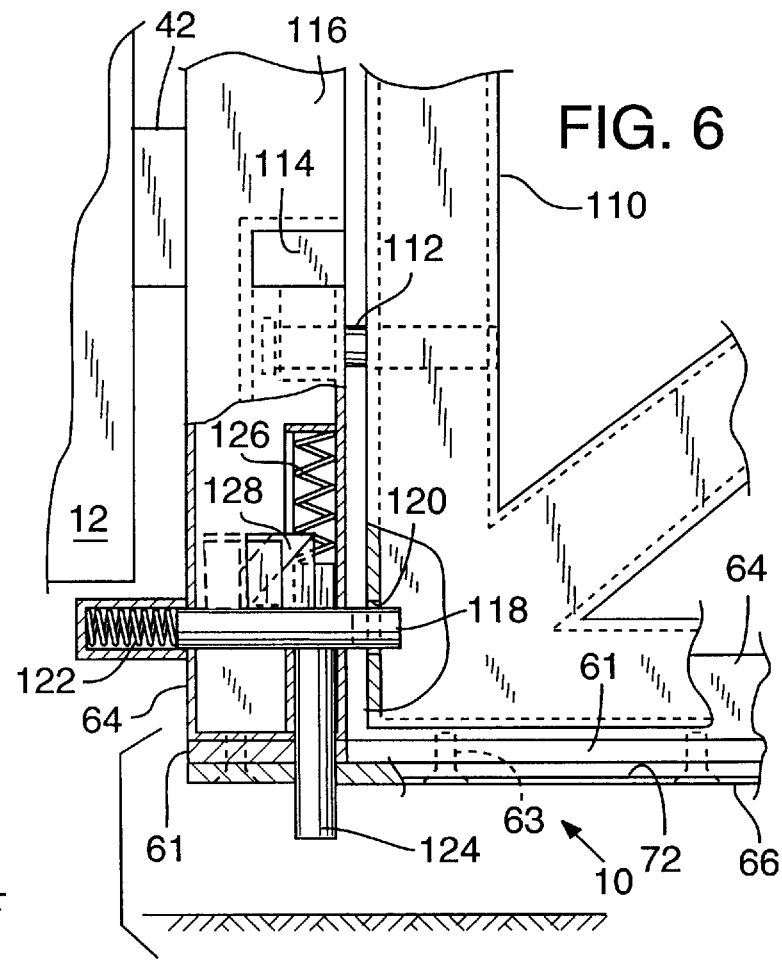

5,885,048

POWERED CART FOR MOVING HEAVY OBJECTS

FIELD OF INVENTION

This invention relates to a powered cart used to move heavy fragile objects, e.g., a main frame computer over substantial distances, e.g., between buildings, and more particularly, it relates to a cart that provides floor level loading with powered lifting and powered and controlled maneuvering capability.

BACKGROUND OF THE INVENTION

The use of forklifts and electric jacks are well known and have been extensively used for many years. Heavy loads are stacked on pallets and the fork lifts and/or electric jacks are provided with lifting forks that slide into the pallets and lift the loaded pallets off the floor. The loaded pallets are then maneuvered by the operator to a desired location and lowered back to the floor and the lifting forks withdrawn. The fork lifts and electric jacks are designed for warehouse type of use and can be found in most manufacturing and distribution facilities.

The lifting forks of the fork lifts and electric jacks are not so conveniently used for moving objects not loaded on pallets. Consider for example a refrigerator having little or no clearance between the cabinet and the floor (although often supported on rollers). There is insufficient room for a lifting fork to be inserted under a refrigerator and in any event, if lifted, the load would be unwieldily with a high probability of causing damage. Refrigerator dollies are typically used to transport refrigerators (the refrigerators being tilted to permit a dolly plate to slide under the refrigerator, the refrigerator lowered back onto the plate, the refrigerator strapped to the dolly and then tilted back onto a pair of wheels and then maneuvered manually to a desired location). However, the present invention is concerned with the transport of such items as main frame computers that although posing the same kind of transport problem as a refrigerator can weigh five to ten times what a refrigerator weighs and has a value that is 100 to 1000 times that of a refrigerator.

Fork lift trucks, electric jacks or refrigerator dollies are not acceptable transportation devices for moving heavy fragile articles, e.g., main frame computers that weigh upwards of 1200 pounds and are valued in the hundreds of thousands of dollars.

BRIEF DESCRIPTION OF THE INVENTION

The preferred embodiment of the present invention is essentially a cart that is custom designed for the movement of large, heavy cabinet style items such as main frame computers. The main frame computers are typically supported on rollers that slightly elevate the cabinet of the computer off the floor, e.g., about ⅜ of an inch. The cart is configured to have a thin steel plate, ( e.g., ¼ inch thick) designed to rest flat on a floor with a tapered edge that allows a main frame computer to be easily rolled up the tapered edge and fit onto the plate. The plate is preferably T1 steel and resists buckling but is nevertheless reinforced with a ⅜ inch bar fastened to the top of the plate down the center of the plate and oriented normal to the tapered edge to allow the computer rollers to straddle the bar.

The sides of the plate other than the tapered side are provided with walls of tubular steel having a height of about three feet. A softer (softer than T1 steel) steel strip is provided along each edge of the T1 plate and attached to the plate by bolts. The tubing of the walls is welded to the strip. A horizontal support channel is welded to the exterior of the tubing for reinforcement and for carrying hydraulic fluid lines as will be explained. A gate is provided with securement latches that latch onto the open ends of the two opposed side walls and provide closure of the cart interior. As desired, cushioning may be provided on the walls and the gate to restrict movement of the item contained in the container.

The opposed side walls (adjacent the opening) are referred to as a front wall and a rear wall. A lifting wheel is provided close to each side edge on the exterior of the front wall with the wheels slidable up and down between a position where the wheels extend below the bottom plate, e.g., 1½ inches below the plate, and above the bottom plate sufficient to allow the plate to rest flat on the floor. Hydraulic motors mounted to the front wall exterior provide lifting force to the wheels, the hydraulic motors being powered by a hydraulic power source. Hydraulic lines extend between the motors along a horizontal support channel to the hydraulic power source.

A power unit is mounted to the rear wall of the cart. The lifting portion of an electric jack can be adapted for this use and in one embodiment, a BAKER brand electric jack was modified for this purpose. The power unit includes a component referred to as a second component supported on a central drive wheel and a first component mounted for relative up and down movement relative to the second component. The first component is secured to the back wall of the container portion of the cart, e.g., by welding. The power unit contains a power source, e.g., rechargeable batteries as well as a hydraulic reservoir and pump. A control arm is provided on the power unit and includes controls for forward and reverse drive, braking and the ability to steer the drive wheel. Provision may be made for an operator to ride on either the cart or to walk behind the cart while manipulating the controls of the control arm.

As generally described, the operation of the cart involves first lowering the cart to the floor and removing the gate. (In one embodiment the gate is provided with safety latches that prevents removal of the gate unless the cart is lowered to the floor.) The main frame computer is simply rolled onto the bottom plate, easily accomplished by a single person in view of the very slight incline of the tapered edge. The gate is replaced and the hydraulics are actuated to raise the cart off the floor. The cart is now supported on the two front wheels and the rear driving wheel. (Preferably stabilizers, e.g., rollers or wheels raised slightly off the floor are provided at spaced distances at each side of the drive wheel to prevent side tipping of the rear end.) The arm (provided with a handle) is lowered or raised to a mid point position (between vertical and horizontal) to release a drive wheel brake, and the drive action of the drive wheel is engaged. The arm is manually moved left and right to steer the cart and braking is achieved by dropping or raising the arm.

The particulars of the drop cart generally described will be more fully appreciated upon reference to the following detailed descriptions and drawings referred to therein.

BRIEF DESCRIPTION OF THE DRAWINGS

FIG. 2 is a side view of the cart of FIG. 1 showing a container portion of the cart in a lowered position;

FIG. 2A is a view as viewed on view lines 2—2 of FIG. 2;

FIG. 3 is a side view of the cart of FIG. 1 showing the container portion of the cart elevated;

FIG. 4 is a view of a gate of the cart of FIG. 1;

FIG. 5 is a partial view of an end post of a wall of the cart of FIG. 1;

FIG. 6 is a view illustrating a lock mechanism for locking the gate of FIG. 5 to the cart of FIG. 1; and, FIG. 7 is a view of an alternate embodiment of the gate for the cart of FIG. 1.

DESCRIPTION OF THE PREFERRED EMBODIMENT

Figure 1:
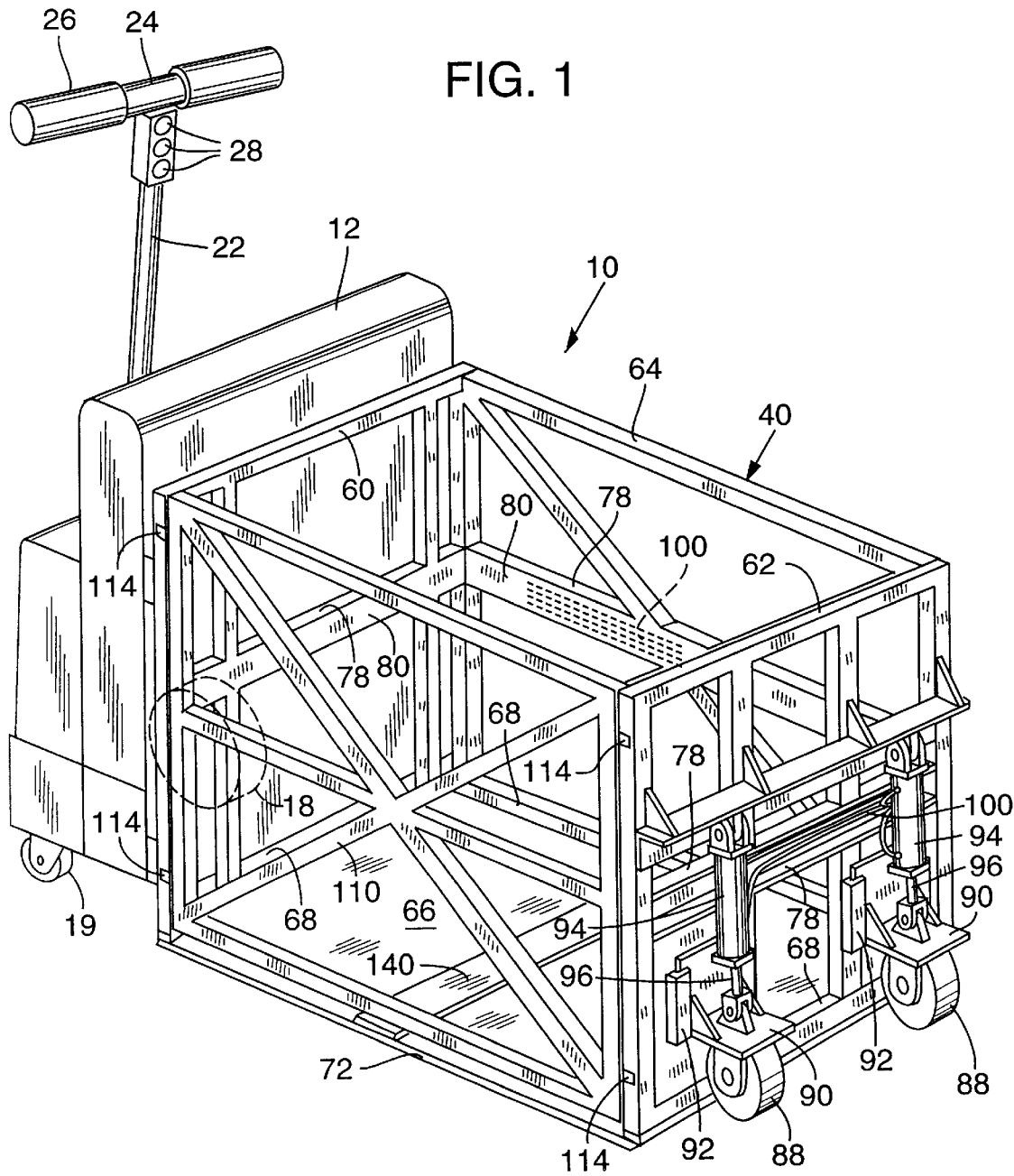
FIG. 1 is a perspective view of a powered cart of the present invention.

FIGS. 1, 2 and 3 illustrate a powered cart 10 of the present invention. The cart 10 has a known self contained power unit 12 that includes a battery pack 13 to provide electrical power to a drive motor 14, a unitized hydraulic motor and pump 16 and other accessories. The drive motor 14 is coupled to a drive wheel 18 in a known manner to propel the cart 10. The drive motor 14 is reversible so that the drive wheel 18 may be rotatably driven in either direction of rotation to provide forward and reverse direction of motion for the cart 10. Stabilizers 19 are provided near each side edge of the power unit 12 to prevent excessive tilting of the power unit 12 on the wheel 18.

The wheel 18 has a conventional braking system for stopping the motion of the cart 10 and to lock the cart 10 in position. The wheel 18 is pivotally mounted to the power unit 12 to provide steering capability. A control arm 22 is coupled to the wheel 18 and is used to pivot the wheel 18 by moving the arm either to the left or the right to provide steering capability. The control arm 22 is also pivotally movable upward and downward. Pivoting the control arm to either the upward or downward position activates the brakes on the wheel 18. As shown in FIG. 3, movement of the arm 22 within the range indicated by arrow A in the up position provides braking for the wheel 18. Braking is also provided within the range indicated by arrow B in the down position. The center range in which the control arm is movable as shown by arrow C is the operational range for activating the motor 14 to propel the cart 10. The arm 22 may be pivoted either to the left or the right through out the full range of up and down motion of the arm 22 to control the steering of the wheel 18.

Handlebars 24 extend from arm 22 to facilitate manipulation of the arm 22 by an operator. A motor control 26 is provided on the handlebar 24 to control the operation of the motor 14. The control 26 is preferably of the type that will variably control the rotational rate of the motor 14 and thus will control the rate of travel of the cart 10. A hydraulic motor control 28 is provided on the arm 22 for operation of the hydraulic motor 16.

The power unit 12 has a known carriage 42 that is movable upwardly and downwardly by powered extension and retraction of a piston rod 50 of a double acting cylinder (motor) 46. The motor and pump 16 provide hydraulic power to the cylinder 46 to move the carriage under power in both the up and down directions.

A rear wall 60 of a container portion 40 is fixedly mounted to the carriage 42 of the power unit 12 in a conventional manner such as by welding. Extension and retraction of the piston rod 50 of the cylinder 46 will move the carriage 42 downwardly and upwardly and thus the container portion 40 downwardly and upwardly relative to the power unit 12.

The container portion 40 has a rear wall 60, a front wall 62 and a side wall 64 that extend upwardly from a floor (plate) 66. The floor 66 is fixedly attached in a conventional manner to a brace 68 that is a portion of and extends along the base of the rear wall 60, the front wall 62 and the side wall 64. The walls 60, 62, 64 and the floor 66 define a container for receiving items to be transported by the cart 10.

The floor 66 is preferably of a high strength plate material such as T1 steel or equivalent having a thickness of about ¼ inch. Because the strength of the T1 steel can deteriorate from welding, it is desirable to attach a softer metal strip 61 to the side edge of the plate 66 using flat head screws or bolts 63 (see FIG. 2A). The wall members, e.g., wall member 64 can then be welded to the strip 61 in a conventional manner.

A side edge 72 of the floor 66 (see FIG. 2A) is tapered to provide an inclined ramp to facilitate moving items onto the floor 66. The side edge 72 is formed on the floor 66 at the entry of the container and is on the side opposite the side wall 64.

The rear wall 60, the front wall 62 and the side wall 64 are suitably braced by known structural members to provide structural integrity. Additionally, channel members 78 are fixedly attached to the walls 60, 62 and 64 with the flat portion of the channel members 78 facing inwardly into the defined container. The channel members 78 are positioned at about the midpoint between the tops of the walls 60, 62, 64 and the floor 66. The channel members 78 are preferably covered with a non marring resilient material 80 such as a plastic like material. The material 80 protects the items placed against the channel members 78.

The front wall 62 has wheels 88 for supporting the front end of the cart 10. The wheels 88 are rotatably mounted to a slide bracket 90. The slide bracket 90 is slidably mounted in a bracket 92 affixed to the front wall 62. A double acting cylinder 94 provides the motive power to move the bracket 90 in the bracket 92. One end of the cylinder 94 is coupled to a bracket 98 affixed to the wall 62 and a cylinder rod 96 of the cylinder 94 is coupled to the slide bracket 90. Moving the bracket 90 (and the wheel 88 mounted thereto) upward by powered retraction of the cylinder rod 96 lowers the floor 66 of the cart 10 onto the surface supporting the cart 10. The carriage 42 will be lower simultaneously to lower the container portion 40 to the position shown in FIG. 2. The slide bracket 90 when moved downward by the powered extension of the piston rod 96 will force the wheel 88 into contact with the supporting surface and continued movement of the slide bracket 90 (and wheel 88) downward will elevate the floor 66 off the surface supporting the cart 10. The carriage 42 will be simultaneously elevated to elevate the container portion 40 to the position shown in FIG. 3.

Hydraulic lines 100 are extended from the hydraulic motor 16 to the cylinders 94. The hydraulic lines are extended within the U-shaped cavity portion of the channels 78. The hydraulic motor 16 provides the motive power for the cylinders 94.

A retaining gate 110 (best seen in FIG. 4) is provided for the open side of the defined container. The gate 110 is preferably of a light weight material such as aluminum. The gate 110 has extending pins 112 that fit in apertures 114 (best seen in FIG. 5) provided in the end posts 116 of the end and front walls 60, 62. An aperture 120 is provided in each end post of the gate 110.

It is preferable that a locking mechanism be provided to lock the gate 110 in position when the container portion 40 (floor 66) is elevated off the surface supporting the cart 10. FIG. 6 illustrates one example of a locking mechanism to lock the gate 110 in position. It will be appreciated that other locking devices may be employed to lock the gate in position. A locking pin 118 locks the gate 110 in position when the floor 66 is elevated off the surface supporting the cart 10. Lowering the floor 66 down onto the supporting surface releases the locking pin 118 permitting the removal of the gate 110. An aperture 120 is provided in each end post of the gate 110 to receive the pin 118. A spring 122 urges the pin 118 into the aperture 120 when the gate is installed in position. An actuating pin 124 that is biased to move downward by a spring 126 is provided to move the pin 118 out of the aperture 120 when the floor 66 is lowered onto a supporting surface. The pin 124, as the floor is lowered will contact the supporting surface and will be forced upward against a tapered wedge 128 connected to the pin 118. As the pin 124 moves upward, the wedge 128 will cause the pin 118 to move out of the aperture 120 in the gate 110 to thus release the lock on the gate 110. When the floor 66 is elevated the spring 126 will force the pin 124 downward away from the wedge 128. The spring 122 will force the pin 118 to move into the aperture 120 in the gate 110.

Figure 7:
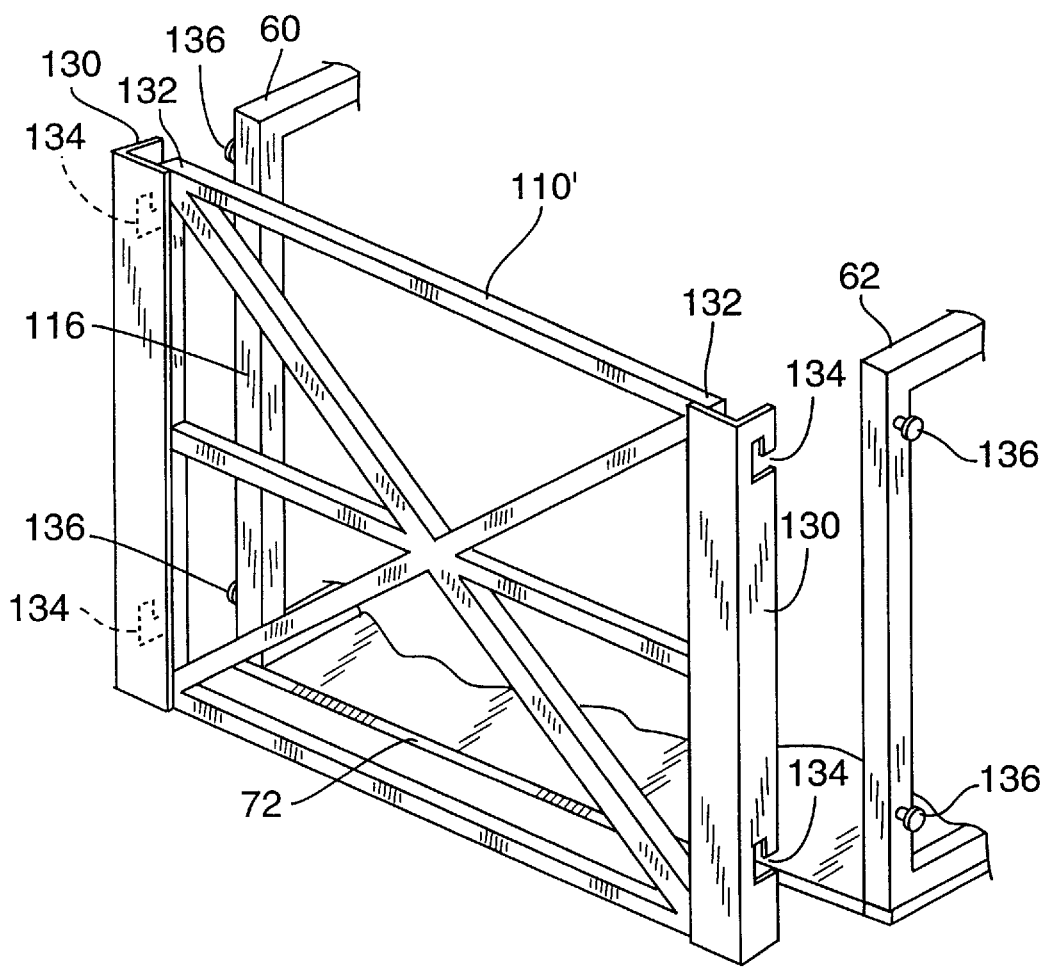

FIG. 7 illustrates another embodiment of the gate designated as 110'. The gate 110' is similar to gate 110 and is arranged to fit the opening of the container. As shown, an angle 130 is fixedly mounted to the end posts 132 of the gate 110'. The distance between the leg of the angle 130 and the end post is sufficient to receive the end post 116 of the walls 60, 62. A formed notch 134 is provided in the leg of the angle to receive a pin 136 that is provided on the end posts 116 of the walls 60, 62. The notches 134 and the pins 136 in combination will retain the gate 110' in position.

The floor 66 may be further structurally enhanced by the provision of a beam (bar) 140 that is fixedly attached to the floor 66 as shown in FIG. 1. The beam is extended from the side wall 64 to the tapered edge 72 of the floor 66. It is preferable that the end of the beam adjacent the edge 72 be tapered in the same manner as the edge 72.

The cart 10 is particularly suited for transporting heavy objects such as main frame computers for example. Typically the cabinet of the main frame computer will have its cabinet mounted on rollers or wheels. The clearance between the base of the cabinet and the supporting surface is often minimal and the wheels or rollers are intended only for moving the cabinet a short distance. Additionally the weight of the cabinet is generally excessive for easily moving the cabinet a long distance.

When a large heavy object, such as a main frame computer requires moving, the cart 10 is moved in close proximity to the cabinet. The container portion 40 of the cart 10 is lowered to the supporting surface by lowering the carriage 42 on the unit 12 and simultaneously pivoting the wheels 88 upward. The floor 66 will now be in contact with the supporting surface and the locking pin 118 will be retracted. The gate (if installed) is removed to provide an opening to the defined container of the container portion 40. The main frame computer is rolled up the inclined edge 72 onto the floor 66. The gate 100 is installed in the open side of the container. The container portion 40 is elevated by simultaneously elevating the carriage 42 and lowering the wheels 88. As the floor 66 is elevated off the supporting surface, the latch mechanism 118 will lock the gate in position.

The cart 10 is maneuvered by manipulation of the arm 22 and operation of the control 26 to control the drive wheel 18. When the cart 10 has been moved to its destination, the container portion 40 is lowered by moving the carriage 42 downward and the wheels 88 upward. When the floor 66 contacts the supporting surface the latch mechanism 118 will be released and the gate 110 may be removed. The main frame computer is then rolled off the floor 66 and placed in a desired position.

Those skilled in the art will recognize that modifications and variations may be made without departing from the true spirit and scope of the invention. The invention is therefore not to be limited to the embodiments described and illustrated but is to be determined from the appended claims.

I claim:

1. A moving cart comprising:
   a chassis and a container;
   said container having a floor plate with a flat bottom and side edges, one of said side edges being tapered and defining a container opening, and restraining side walls extended upwardly from said floor plate along the remainder of the side edges and an openable gate extended upwardly from said floor plate along the side edge of said opening;
   said chassis including at least a pair of wheels movably mounted on a front side of said container and a power unit mounted on a rear side of said container, said power unit including a first component rigidly secured to the container the entire portion of which extends above the flat bottom of the floor plate, and a second component that is vertically slidable relative to said first component between first and second positions, a power mechanism that vertically moves the second component relative to the first component, and a steerable power driven wheel mounted on the second component whereby the steerable wheel extends below the flat bottom of the floor plate in the first position and is above the bottom of the floor plate in the second position;
   said wheels on the front side of the container mounted for cooperative vertical sliding movement between first and second positions and a power mechanism that vertically moves the front wheels whereby in a first position the wheels are extended below the bottom of the floor plate and in a second position are above the bottom of the floor plate;
   and at least one power source and manually operated controls connected to said power source for manually operating the movement of said front wheels and said movement of said first component, and for drivably operating said steerable wheel, all cooperatively arranged to provide for the steps of lowering the container with the bottom of the floor plate lying flat and supported on a cart support surface, a load slidably moved up the tapered edge onto the floor plate, and with the gate secured, enabling the cart and load to be raised for full support by the wheels and for controlled movement of the cart along the cart support surface.

2. A moving cart as defined in claim 1 wherein braking mechanism is provided for at least one of the front and rear wheels.

3. A moving cart as defined in claim 2 wherein the power source is self contained on the cart.

4. A moving cart as defined in claim 3 wherein the power driven wheel has a stabilizer wheel mounted laterally on each side of the power driven wheel.

5. A moving cart as defined in claim 4 wherein a handle on a pivotable arm is provided on the second component and connected to the steerable wheel, said braking mechanism provided on the steerable wheel and said controls provided in said handle whereby an operator controls steering of the steerable wheel and braking thereof through manipulation of the controls on the handle and pivotable manipulation of the arm.

6. A moving cart as defined in claim 5 wherein the raising and lowering of the front wheels is produced by hydraulic motors, said power unit including a hydraulic pump and hydraulic lines between said hydraulic pump and the hydraulic motors to provide power on demand to the hydraulic motors.

7. A moving cart as defined in claim 1 wherein the side walls other than the gate are provided with a reinforcing channel defining an inner cavity, said hydraulic lines extending from the power unit to the front wheels through the inner cavity of the reinforcing channel.

8. A moving cart as defined in claim 1 wherein the floor plate is a plate of T1 steel and includes a low profile reinforcing bar extended normal to the tapered edge of the floor plate allowing loads supported on rollers to be loaded on the floor plate with the rollers straddling the bar.

9. A moving cart as defined in claim 8 wherein a strip of steel not T1 steel is bolted to the edges of the floor plate and the side walls are welded to the strip.

\* \* \* \* \*